(12) United States Patent
Seidl

(10) Patent No.: US 11,454,868 B2
(45) Date of Patent: Sep. 27, 2022

(54) STABILIZED CAMERA SYSTEM

(71) Applicant: SHAREVR HAWAII LLC, Kihei, HI (US)

(72) Inventor: Thomas Seidl, Kihei, HI (US)

(73) Assignee: SHAREVR HAWAII LLC, Kihei, HI (US)

( * ) Notice: Subject to any disclaimer, the term of this patent is extended or adjusted under 35 U.S.C. 154(b) by 0 days.

(21) Appl. No.: 16/649,096

(22) PCT Filed: Sep. 20, 2018

(86) PCT No.: PCT/US2018/051952
§ 371 (c)(1),
(2) Date: Mar. 19, 2020

(87) PCT Pub. No.: WO2019/060543
PCT Pub. Date: Mar. 28, 2019

(65) Prior Publication Data
US 2021/0333694 A1    Oct. 28, 2021

Related U.S. Application Data

(60) Provisional application No. 62/561,518, filed on Sep. 21, 2017.

(51) Int. Cl.
*G03B 17/56* (2021.01)
(52) U.S. Cl.
CPC ................. *G03B 17/561* (2013.01)
(58) Field of Classification Search
CPC .................................................. G03B 17/561
See application file for complete search history.

(56) References Cited

U.S. PATENT DOCUMENTS

| | | | |
|---|---|---|---|
| 5,495,576 A | 2/1996 | Ritchey | |
| 9,921,464 B1* | 3/2018 | Choi | G03B 17/561 |
| 10,053,230 B2* | 8/2018 | Tian | G03B 15/006 |
| 10,259,593 B2* | 4/2019 | Tian | F16M 11/18 |
| 2002/0003664 A1 | 1/2002 | Mearini | |
| 2002/0036649 A1 | 3/2002 | Kim | |
| 2004/0183941 A1* | 9/2004 | McCutchen | H04N 13/239 348/373 |
| 2007/0182812 A1 | 8/2007 | Ritchey | |
| 2008/0013944 A1 | 1/2008 | Yamane | |
| 2008/0260369 A1 | 10/2008 | Ibaraki | |
| 2010/0277617 A1 | 11/2010 | Hollinger | |
| 2012/0002096 A1 | 1/2012 | Choi | |
| 2012/0063736 A1 | 3/2012 | Simmons | |
| 2012/0217356 A1* | 8/2012 | Park | H04N 7/181 248/122.1 |
| 2013/0163973 A1 | 6/2013 | Tanaka | |

(Continued)

OTHER PUBLICATIONS

International Search Report and Written Opinion for correponding PCT/US18/51952; dated Jan. 29, 2019.

*Primary Examiner* — Noam Reisner
(74) *Attorney, Agent, or Firm* — Niels Haun; Dann, Dorfman, Herrell & Skillman, P.C.

(57) ABSTRACT

A stabilized camera system, comprising a camera having a center of mass associated therewith and having a gap disposed therein, the gap containing the center of mass of the camera and a stabilizer operably connected to the camera for stabilizing motion of the camera, the stabilizer comprising a plurality of motors operably connected to one another.

20 Claims, 15 Drawing Sheets

(56) References Cited

U.S. PATENT DOCUMENTS

| | | |
|---|---|---|
| 2016/0127646 A1 | 5/2016 | Osborne |
| 2016/0286195 A1 | 9/2016 | Lehman |
| 2016/0295108 A1 | 10/2016 | Cao |
| 2017/0192342 A1 | 7/2017 | Liu |
| 2017/0198747 A1 | 7/2017 | Chen |
| 2018/0004064 A1* | 1/2018 | Kim ................. F16M 11/10 |
| 2018/0210322 A1* | 7/2018 | Malukhin ........... G06T 19/006 |
| 2018/0332197 A1* | 11/2018 | Crone ................ G03B 17/561 |
| 2019/0031369 A1* | 1/2019 | Zhang ................ F16M 13/02 |
| 2020/0053260 A1* | 2/2020 | Qi ..................... G02B 27/644 |

* cited by examiner

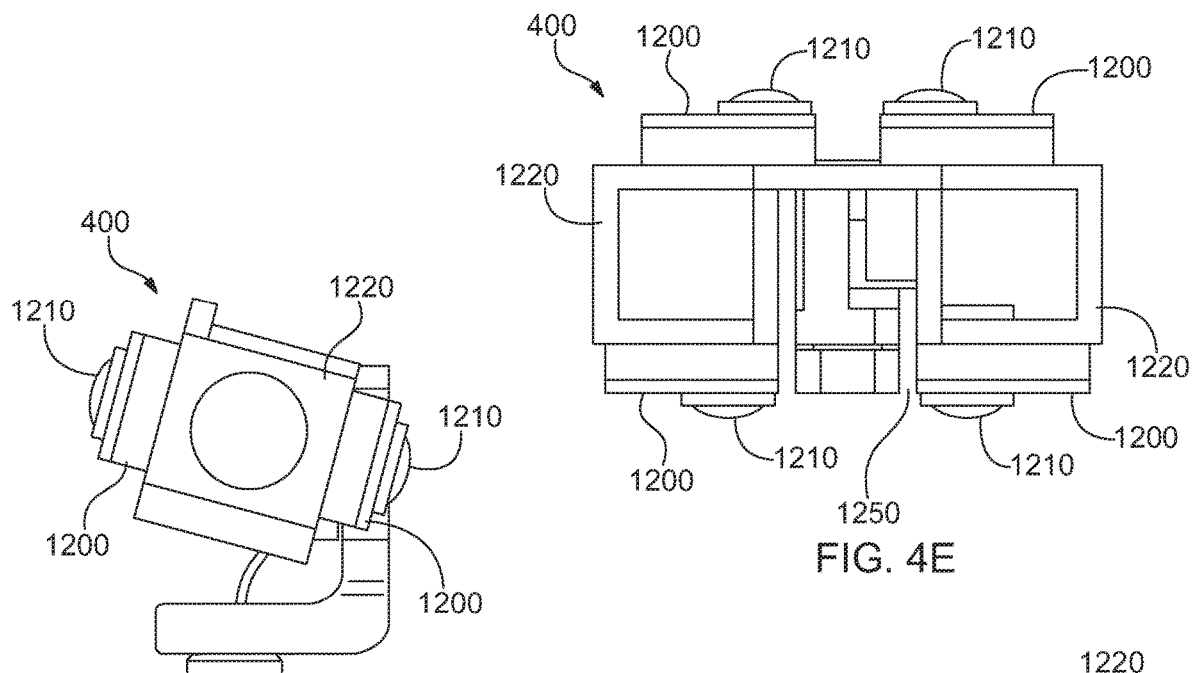
FIG. 4E
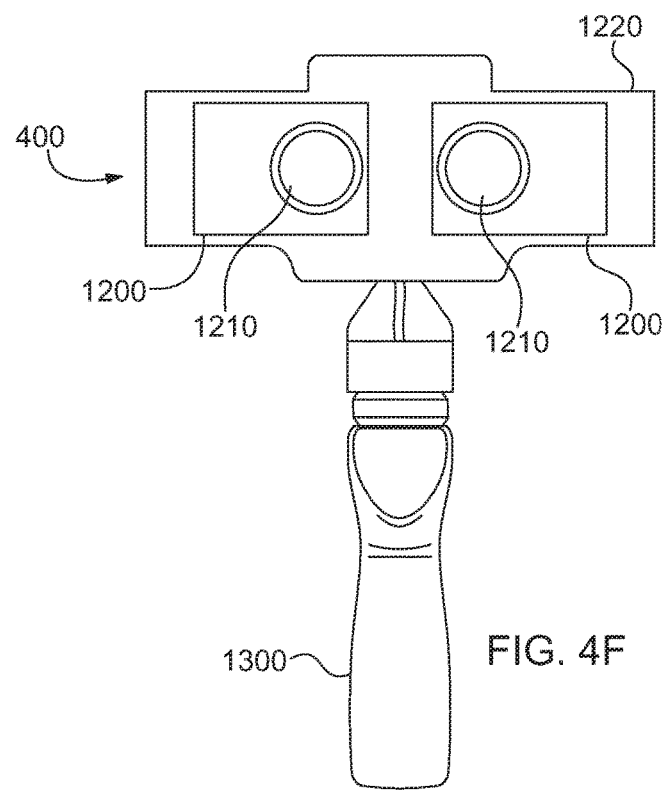
FIG. 4D
FIG. 4F

STABILIZED CAMERA SYSTEM

RELATED APPLICATIONS

This application is a national stage application under 35 U.S.C. 371 for International Application No. PCT/US18/51952, which claims the benefit of priority of U.S. Provisional Application No. 62/561,518, filed on Sep. 21, 2017, the entire contents of which applications are incorporated herein by reference.

Field of the Invention

The present invention relates generally to stabilized cameras, and more particularly, but not exclusively, to stabilized panoramic camera systems configured to create a 3D panoramic virtual reality environment.

Background of the Invention

It can be particularly important for panoramic virtual reality cameras to have stabilization, and can be even more important when dealing with 3D panoramic virtual reality as opposed to 2D panoramic virtual reality. Traditional stabilizers are limited because typically the camera sensor and body of a camera will be in the way and away from an ideal position of the motors. Accordingly, there is a need in the art for improvement to camera stabilizer systems.

SUMMARY OF THE INVENTION

In one of its aspects, the present invention overcomes the problems associated with locating the camera body away from stabilizer motors by providing a gap in the camera body and positioning on or more of the motors close together in the gap, with the motors located proximate the center of mass of the camera.

In one exemplary configuration the present invention may provide a stabilized camera system, comprising a camera having a center of mass associated therewith and having a gap disposed therein, the gap containing the center of mass of the camera. A stabilizer may be disposed externally to the camera and operably connected to the camera for stabilizing motion of the camera. The stabilizer may comprise a plurality of motors, with a selected one of the motors being disposed in the gap proximate the location of the center of mass of the camera. The center of the gap may be located at the center of mass of the camera, and the center of a selected one of the motors may be disposed at the center of the gap and/or at the center of mass of the camera. The camera may include an axle extending through the gap, and the selected one of the motors may be rotatably mounted to the axle and be operable to rotate the axle in response to rotation by the selected motor. The plurality of motors may comprise three motors mounted on three axes orthogonal to each other, with the three motors configured to rotate about a respective one of the three orthogonal axes. The camera may comprise a plurality of imaging systems, each imaging system having imaging optics and an optical sensor positioned to receive an image thereat from the imaging optics. Each imaging system may include a fisheye lens. A motion sensor may be mounted to the camera and operably connected to the motors; each motor may be configured to cooperate with the sensor to maintain the camera at a selected orientation in response to an external force applied to the camera.

BRIEF DESCRIPTION OF THE DRAWINGS

The foregoing summary and the following detailed description of exemplary embodiments of the present invention may be further understood when read in conjunction with the appended drawings, in which:

FIGS. 4A-4F schematically illustrate view of a prototype of an exemplary camera system built in accordance with the present invention, in which FIGS. 4A-4C illustrate isometric views, FIG. 4D illustrates a side elevational view, FIG. 4E illustrates a top view, and FIG. 4F illustrates a side elevational view;

FIGS. 10A-10E schematically illustrate yet a further exemplary camera system in accordance with the present invention, in which FIGS. 10A, 10B illustrate an isometric and top view, respectively, FIGS. 10C-10D illustrate the camera system of FIGS. 10A, 10B with an additional mounting bracket disposed between the cameras, and FIG. 10E schematically illustrates an isometric view of the cameras and mounting bracket of FIG. 10C.

DETAILED DESCRIPTION OF THE INVENTION

Figure 1:
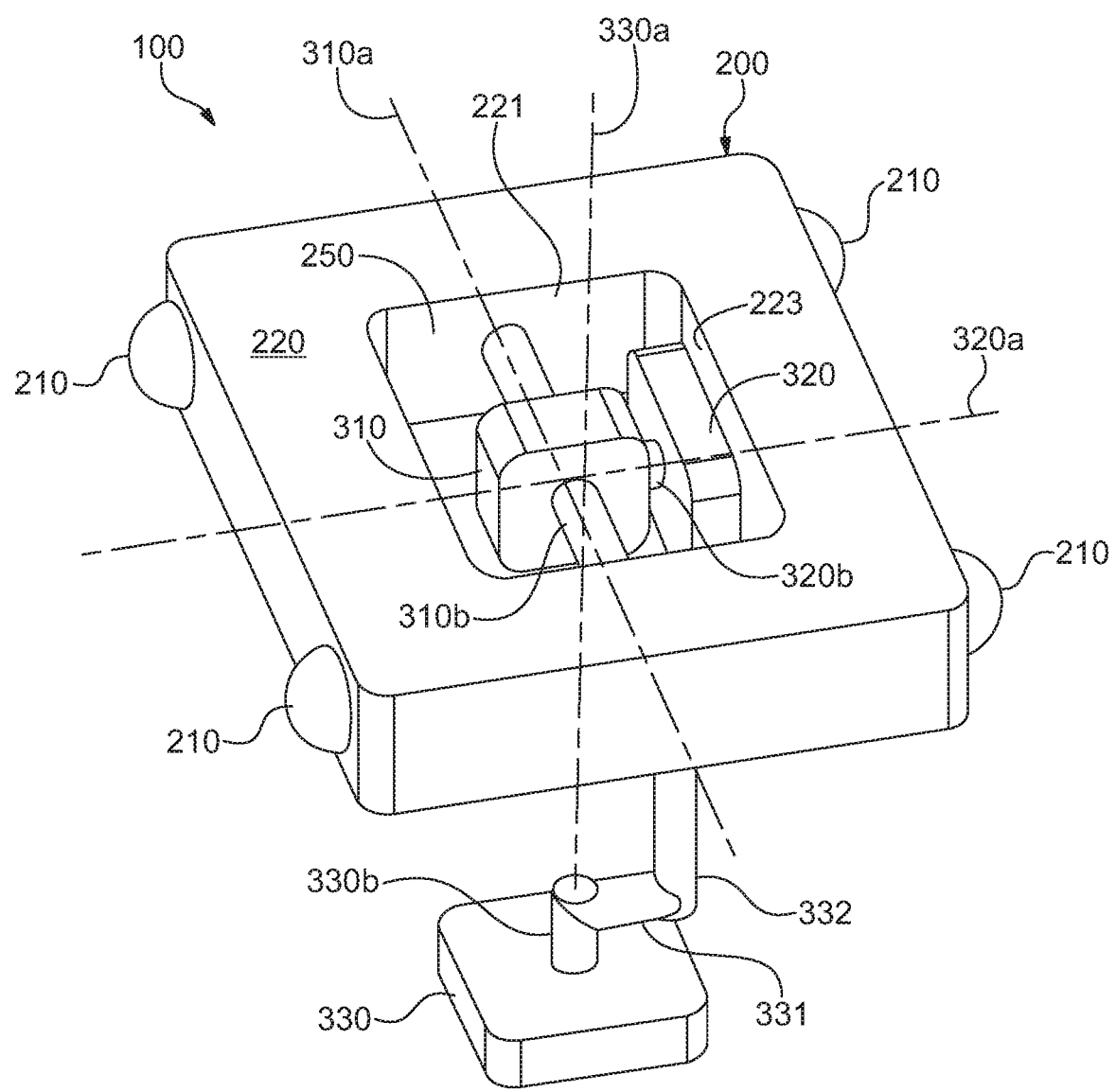
FIG. 1 schematically illustrates an isometric view of an exemplary camera system in accordance with the present invention.

Referring now to the figures, wherein like elements are numbered alike throughout, FIGS. 1-4 schematically illustrate an exemplary configuration of a stabilized camera system 100 in accordance with the present invention. The system 100 may include a camera 200 and a stabilizer 300. The camera 200 may include a camera body 220 having a hole or gap 250 disposed therein. The hole 250 may be disposed at a location that includes the center of mass of the camera 200, which may coincide with the geometrical center of the camera 200. The camera 200 may include a plurality of lenses 210, with each lens 210 having a respective optical sensor (not shown) located within the camera body 220 at the image plane of the lens 210, FIGS. 1-3. The stabilizer 300 may include a plurality of motors 310, 320, 330 which may control three axes of stabilization and work in conjunction with a sensor (not shown) that measures orientation/rotation of the camera 200. The motors 310, 320, 330 are operably connected to the camera 200 to correct for movement by the user to stabilize the camera to provide a level steady picture.

Figure 2:
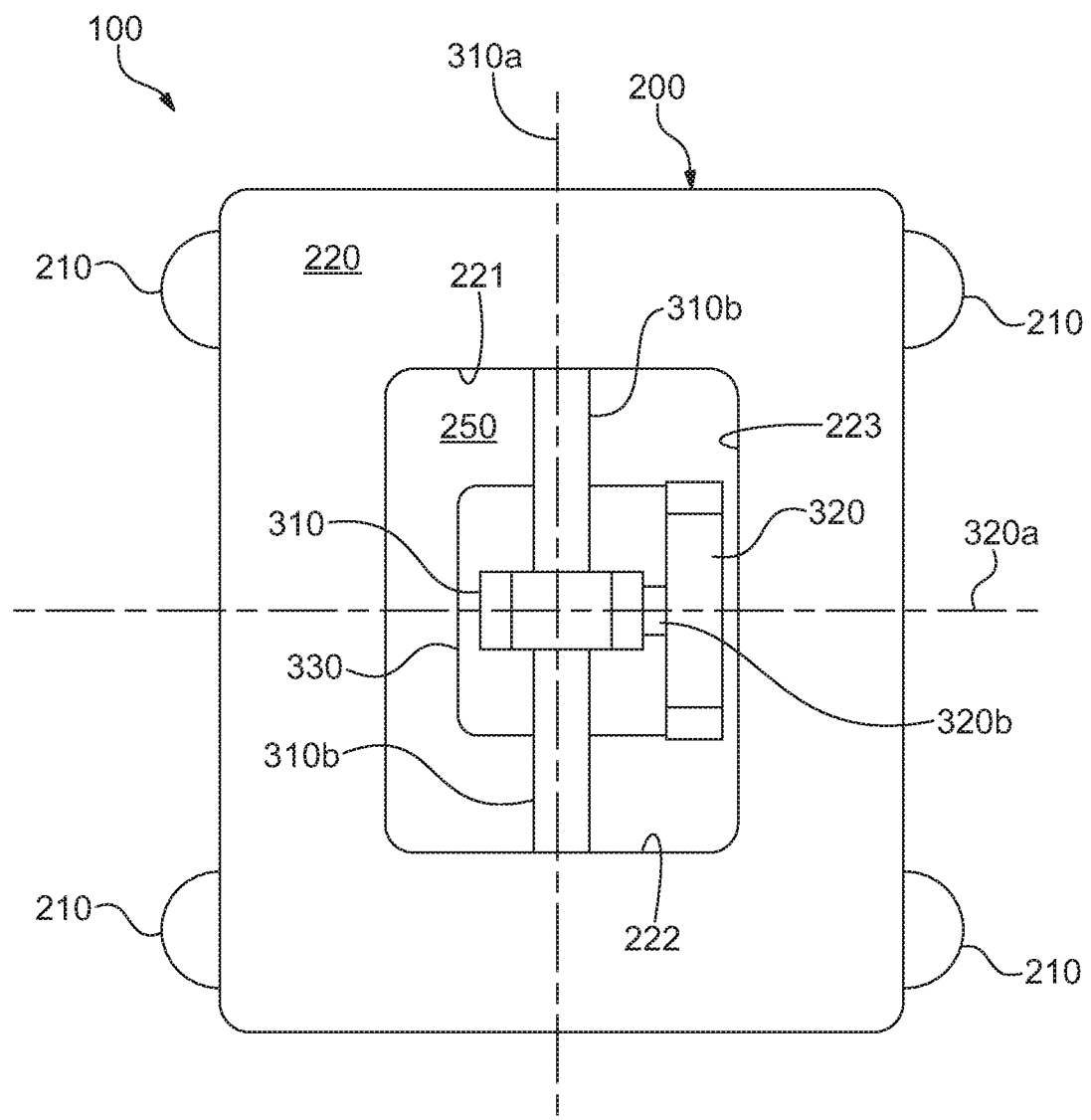
FIG. 2 schematically illustrates a top view of the camera system of FIG. 1.
Figure 3:
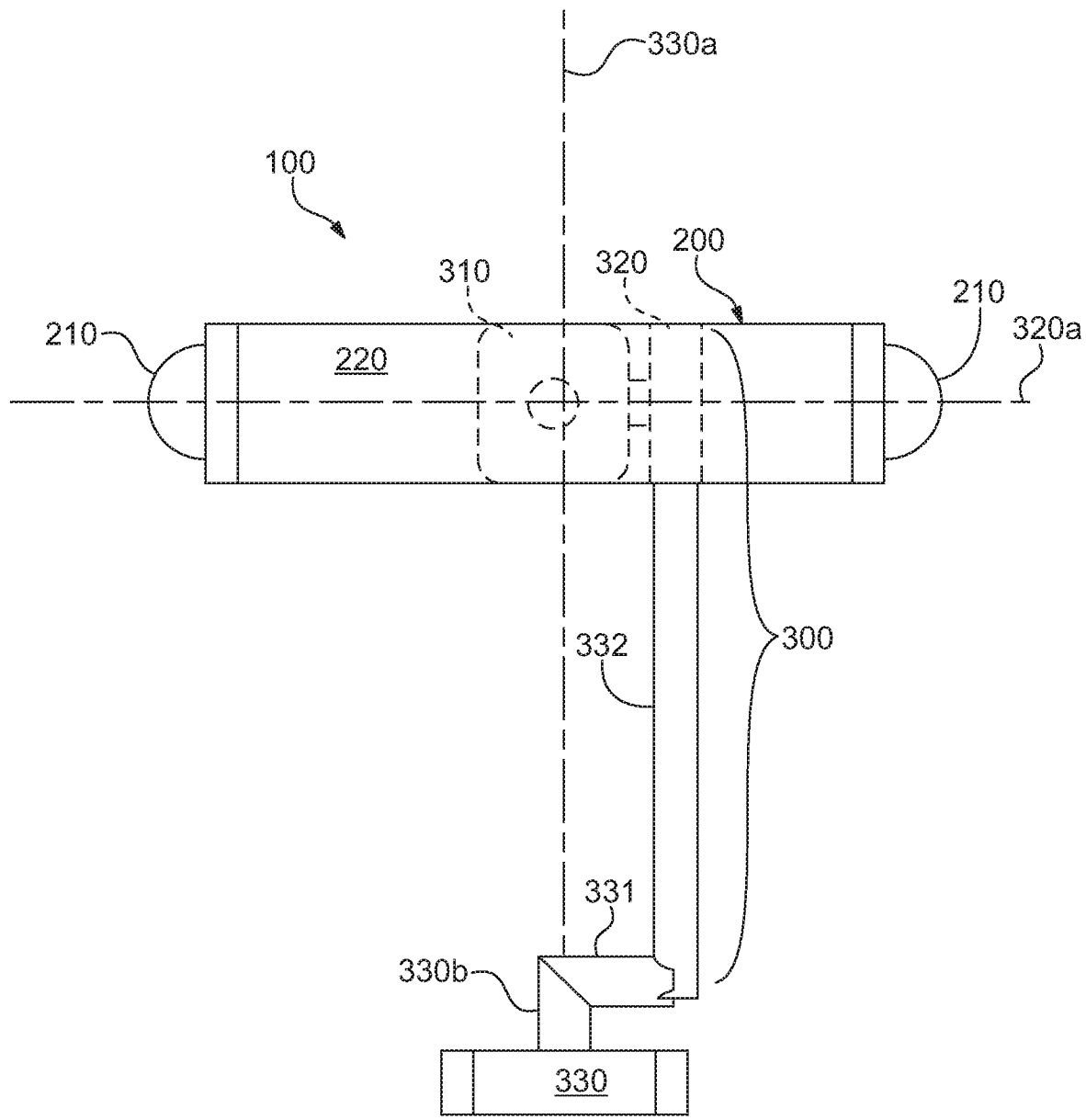
FIG. 3 schematically illustrates a front elevational view of the camera system of FIG. 1.
Figure 4A:
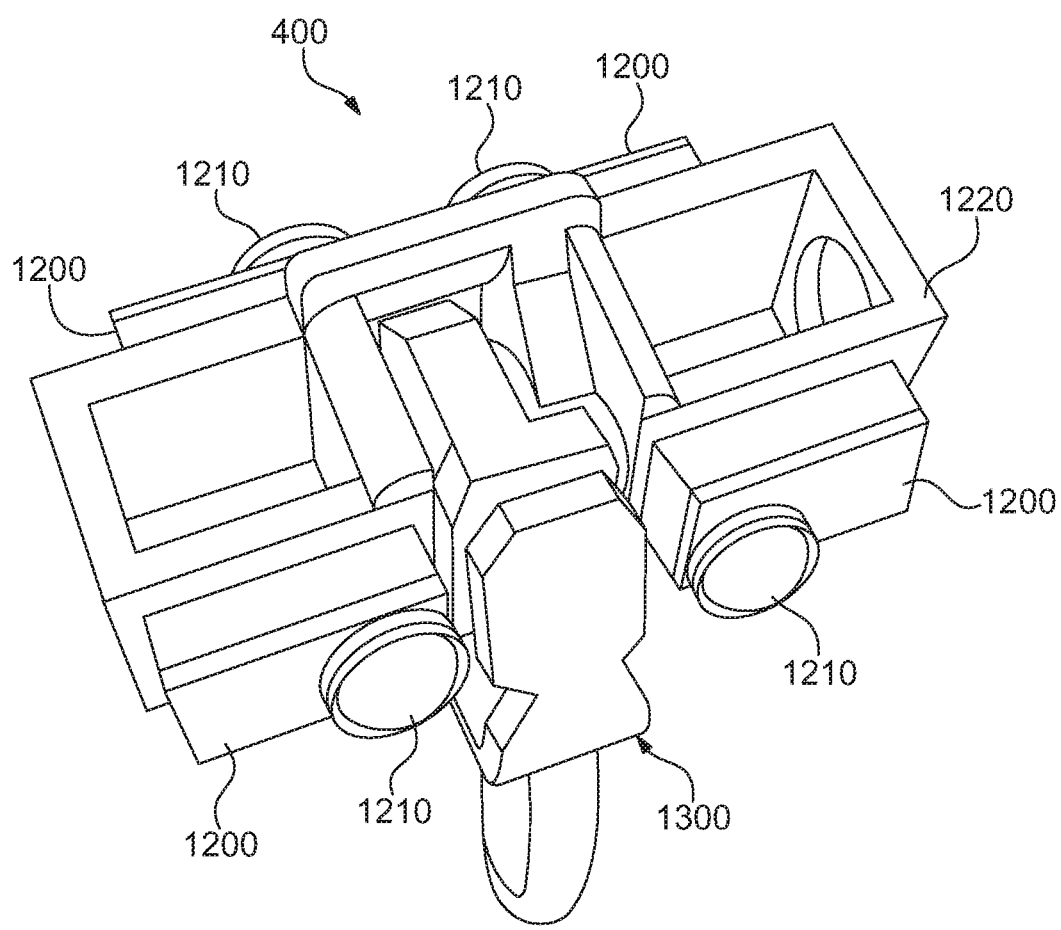
Figures 4B, 4C:
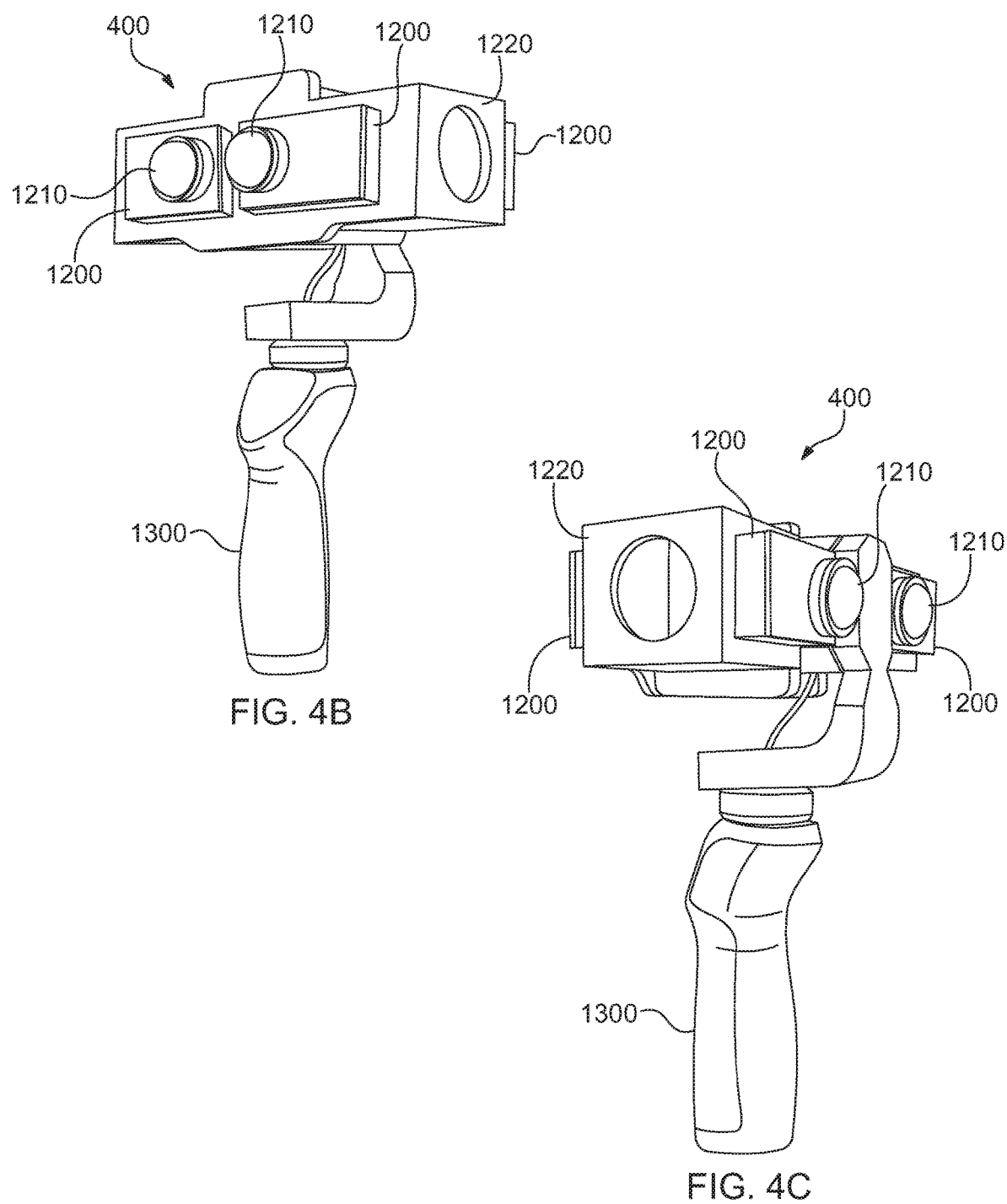

Each of the three motors 310, 320, 330 may have a respective axis of rotation (i.e., a pitch axis 310a, a roll axis 320a, and a yaw axis 330a, respectively) associated therewith, FIGS. 1-3. Pitch, roll, yaw axles 310b, 320b, 330b may be operably connected to a respective one of the motors 310, 320, 330 and may extend along the respective axes 310a, 320a, 330a of the motors 310, 320, 330.

The pitch motor 310 may be rotatably mounted on the pitch axle 310b extending along the pitch axis 310a so that rotation by the motor 310 causes the pitch axle 310b to rotate relative thereto to control the pitch of the camera 200. Similarly, the roll motor 320 may be rotationally mounted on the roll axle 320b extending along the roll axis 320a so that rotation by the motor 320 causes the roll axle 320b to rotate relative thereto to control the roll of the camera 200. Likewise, the yaw motor 330 may be rotationally mounted on the yaw axle 330b extending along the yaw axis 330a so that rotation by the yaw motor 330 causes the yaw axle 330b to rotate relative thereto to control the yaw of the camera 200.

The pitch axle 310b may be disposed in the hole 250 and may extend through the center of mass of the camera 200, with opposing ends of the pitch axle 310b each fixedly mounted to the camera body 220. For example, the hole 250 may include a generally rectangular shape extending through the camera body 220 having opposing side walls 221, 222 to which respective opposing ends of the pitch axle 310b are mounted. The center of mass of the camera 200 may be located at the center of the pitch motor 310. Thus, the pitch motor 310 may be disposed in the hole 250 and positioned proximate the location of the center of mass of the camera 200.

The roll motor 320 may be rotatably connected to the pitch motor 310 and may be disposed in the hole 250 in spaced apart relation from a sidewall 223 of the hole 250 a sufficient distance to permit the roll motor 320 to freely rotate within the camera body 220. For example, the roll axle 320b, while rotatably connected to the roll motor 320 at a first end, may also be fixedly mounted to the pitch motor 310, such as to the body or casing of the pitch motor 310, at a second opposing end of the roll axle 320b, FIGS. 1, 2.

The yaw motor 330 may also be rotatably connected to the pitch motor 310 by the yaw axle 330b which may be fixedly mounted to the pitch motor 310, such as to the body or casing of the pitch motor 310, at a second end of the yaw axle 330b, while the first and of the yaw axle 330b is rotatably connected to the roll motor 330. Alternatively, the yaw motor 330 may be rotatably connected to the roll motor 320 via one or more linkages 331, 332, FIGS. 1, 3. The linkages 331, 332 may be provided as rigid rods with the first linkage 331 closest to the yaw motor 330 fixedly connected at a first end to an end of the yaw axle 330b and extending perpendicularly to the yaw axis 330a a sufficient distance of the so that a second end of the first linkage 331 is disposed under the pitch motor 310. The second end of the first linkage 331 may be connected to the pitch motor 310 via the second linkage 332, with a first end of the second linkage 332 fixedly attached to the second end of the first linkage 331, and an opposing second end of the second linkage 332 fixedly mounted to the pitch motor 310, such as to the body or casing of the pitch motor 310, FIG. 3. Thus, the pitch motor 310 (and camera 200 fixedly mounted thereto) can rotate in the yaw direction in response to rotation of the yaw axle 330b by the yaw motor 330. The linkages 331, 332 and axles 310b, 320b, 330b may be hollow to contain wires therein to permit electrical communication between the motors 310, 320, 330. Alternatively, a housing may be provided around the motors 310, 320, 330, axles 310b, 320b, 330b and linkages 331, 332, which housing may include any electronics and wires. For example, a prototype 400 of the camera system 100 of FIGS. 1-3 was built based on the Osmo Mobile OM150 (DJI Shenzhen, China) 1300 to provide the stabilization function, FIGS. 4A-4F.

The prototype 400 was constructed using a plurality of four cameras 1200 each having their own lens 1210. The four cameras 1200 were mounted to a camera body 1220 which was provided in the form of a rectangular frame so that the frame 1220 and cameras 1200 together provided the function of the body 220 of FIGS. 1-3 with cameras contained therein. The frame 1220 included a centrally located gap 1250 disposed at the center of mass of the combined cameras 1200 and frame 1220, and the stabilizer 1300 was located in the gap 1250 so that the pitch and roll motors were disposed as close to the center of mass is practical.

Figure 5:
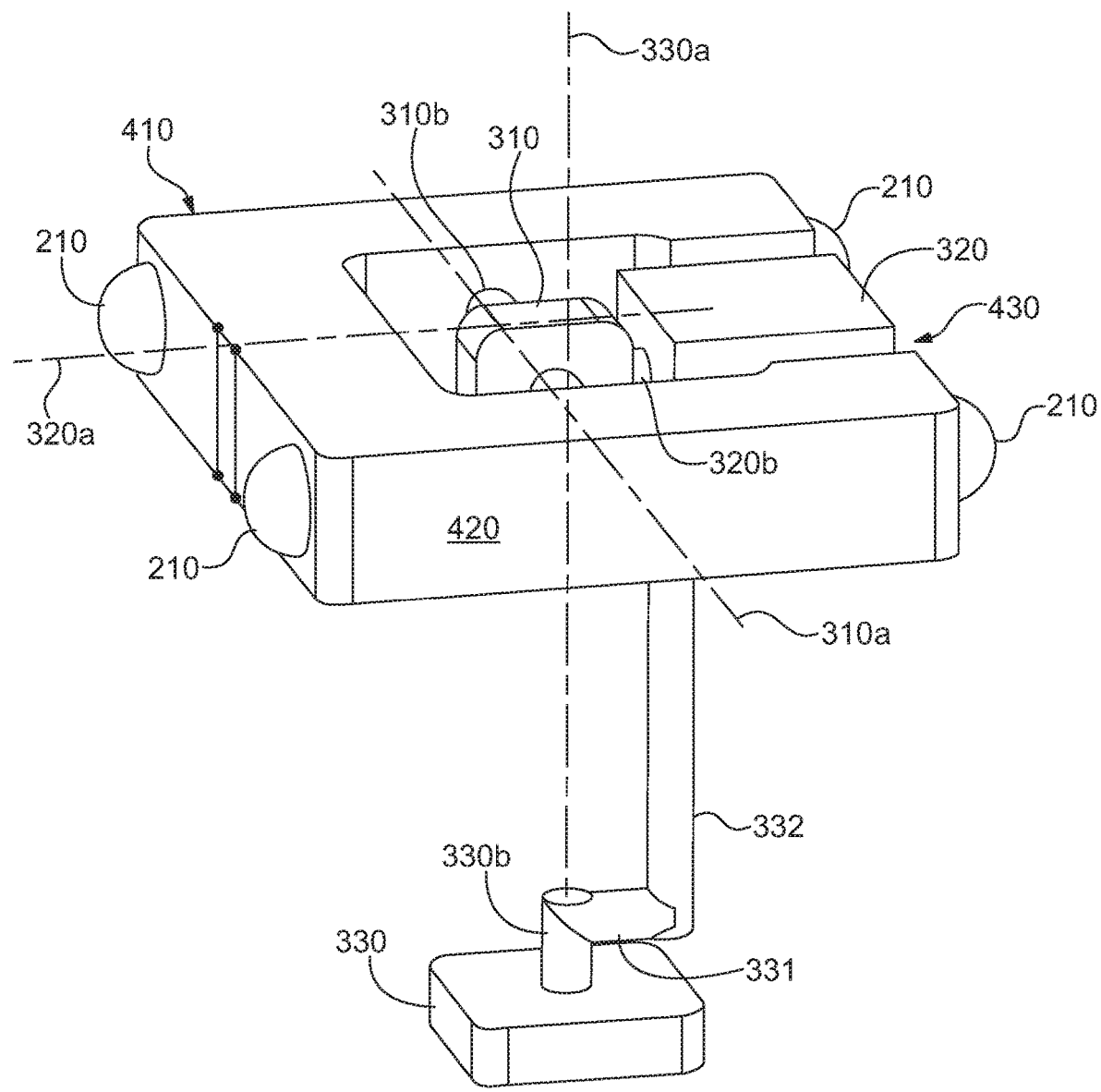
FIG. 5 schematically illustrates an isometric view of an exemplary camera system in accordance with the present invention having a gap in the camera body.
Figure 6:
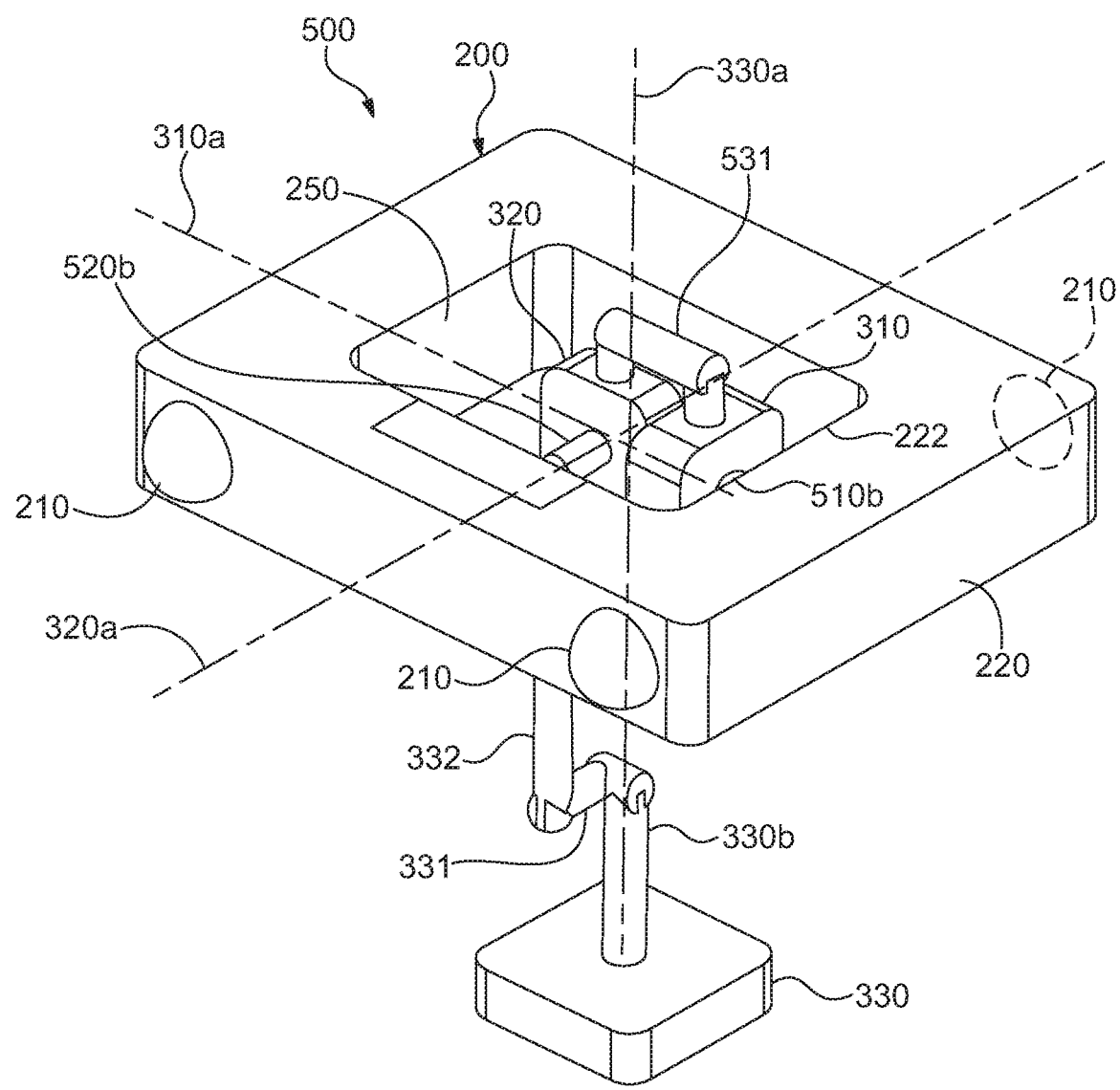
FIGS. 6, 7 schematically illustrate isometric views of a further exemplary camera system in accordance with the present invention.

In an alternative exemplary configuration of the camera 410, the camera body 420 may include an opening 430 therein to provide room to accommodate the roll motor 320, FIG. 5. All other elements illustrated in FIG. 5 bearing the same reference numerals as parts illustrated in FIGS. 1-3 remain as described above in connection with such figures.

Figure 7:
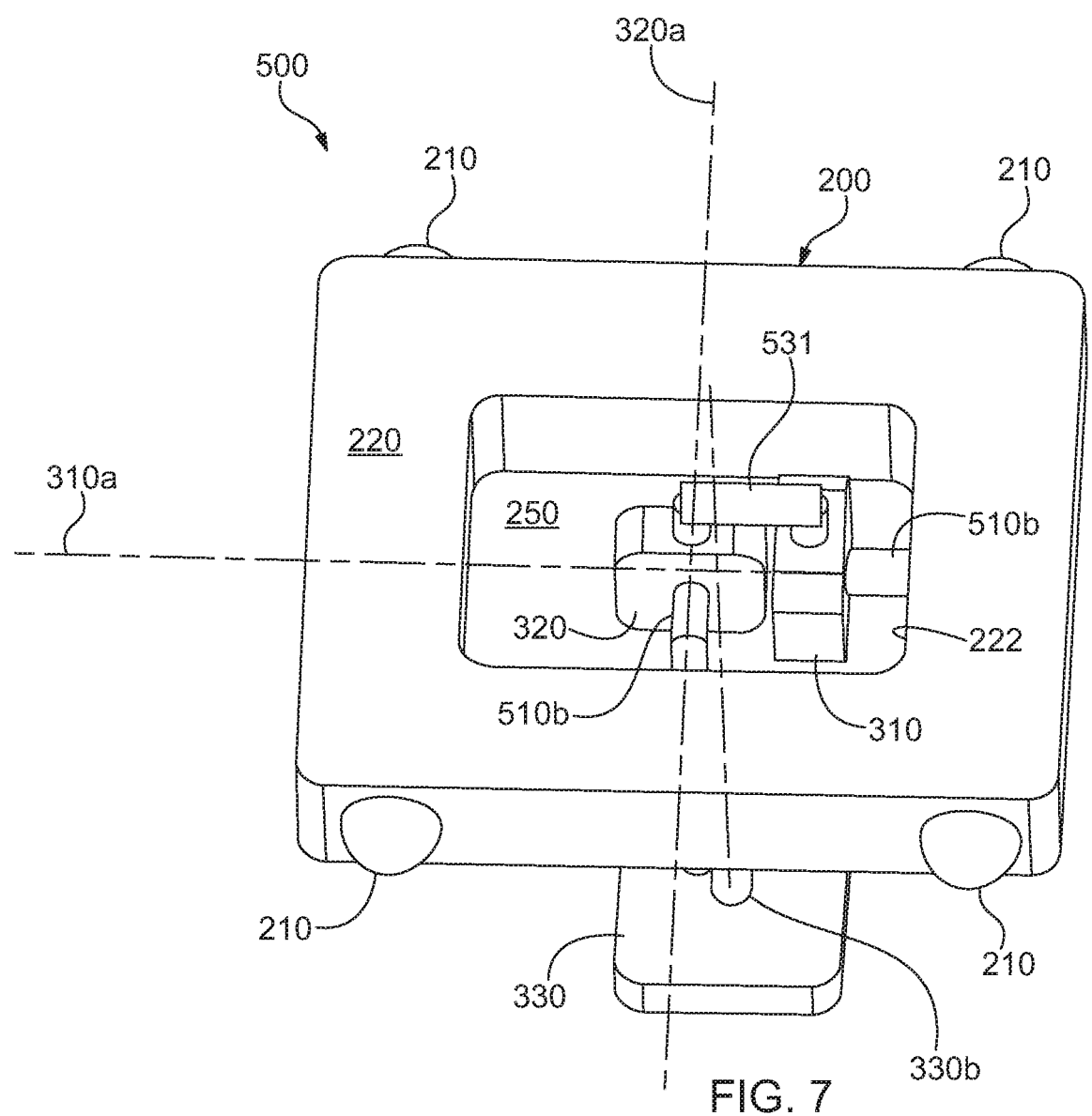
Figure 8:
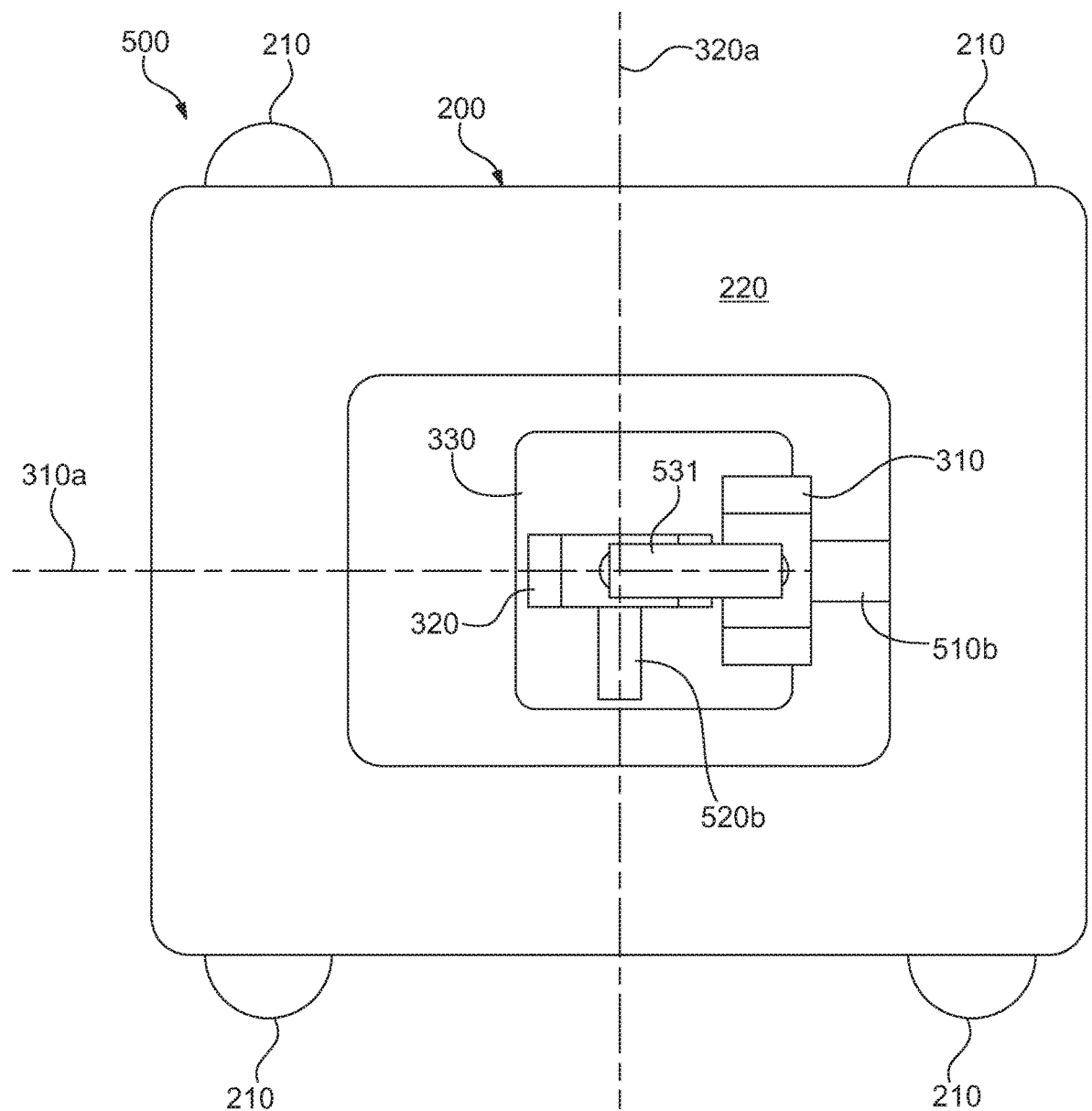
FIG. 8 schematically illustrates a top view of the camera system of FIGS. 6, 7.
Figure 9:
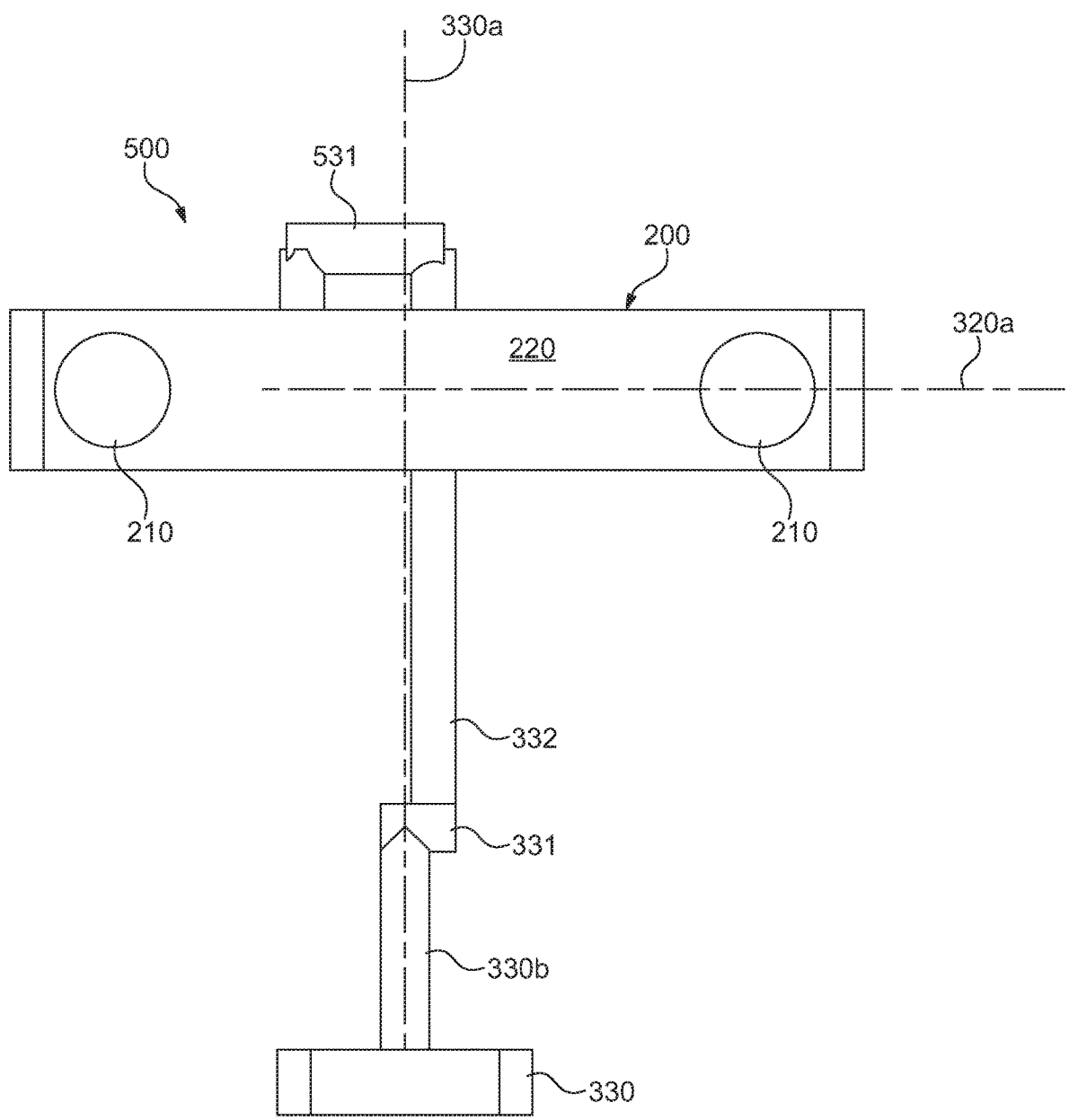
FIG. 9 schematically illustrates a front elevational view of the camera system of FIGS. 6, 7.
Figure 10A:
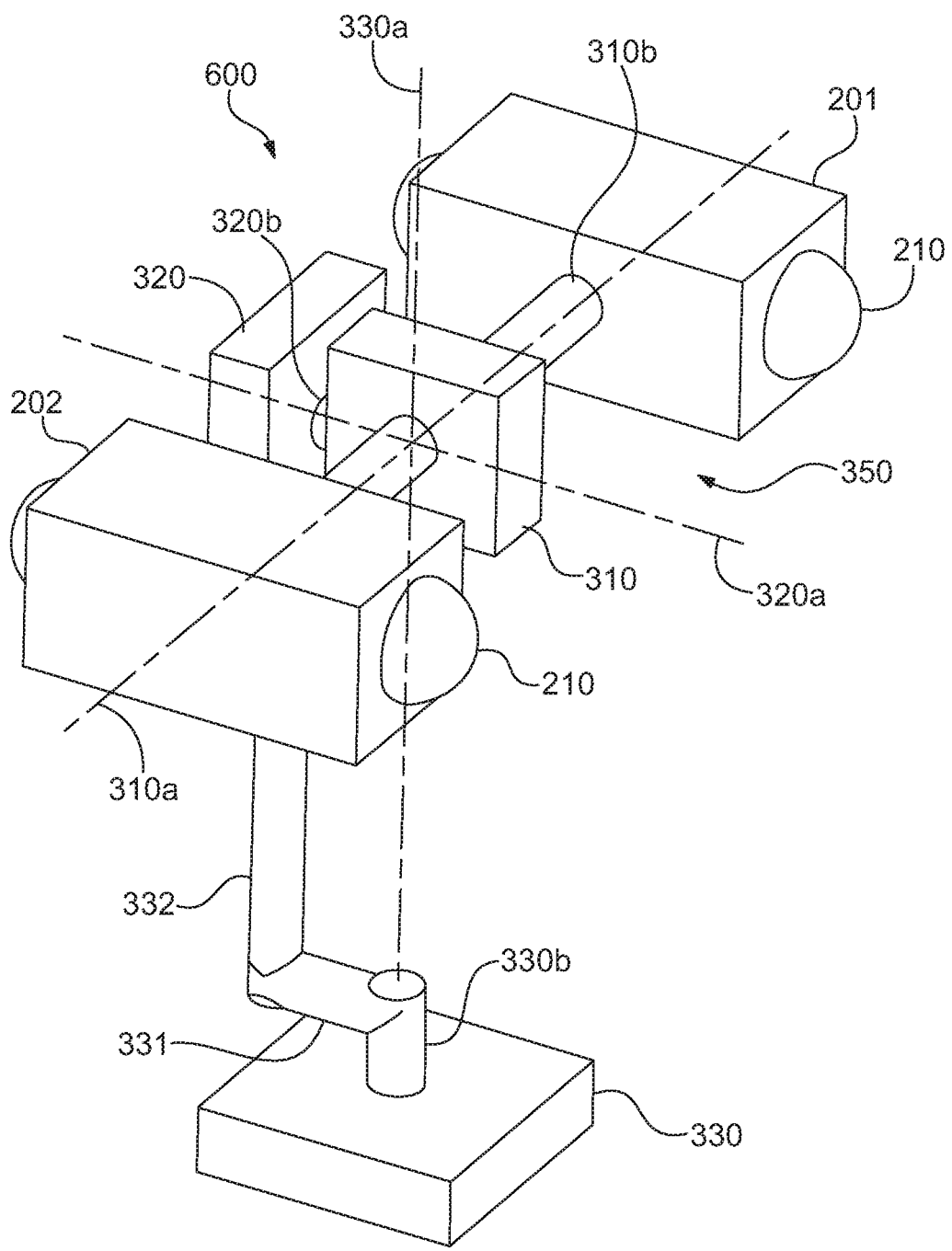
Figure 10B:
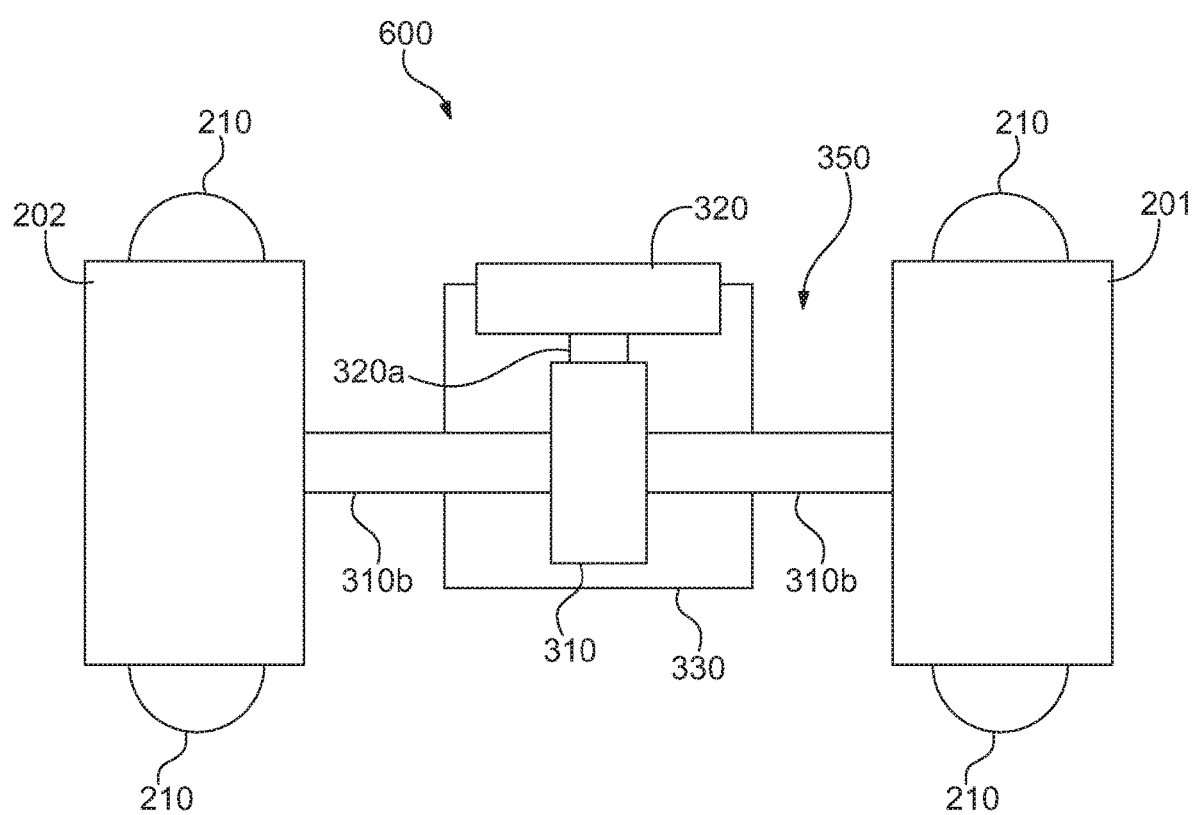
Figure 10C:
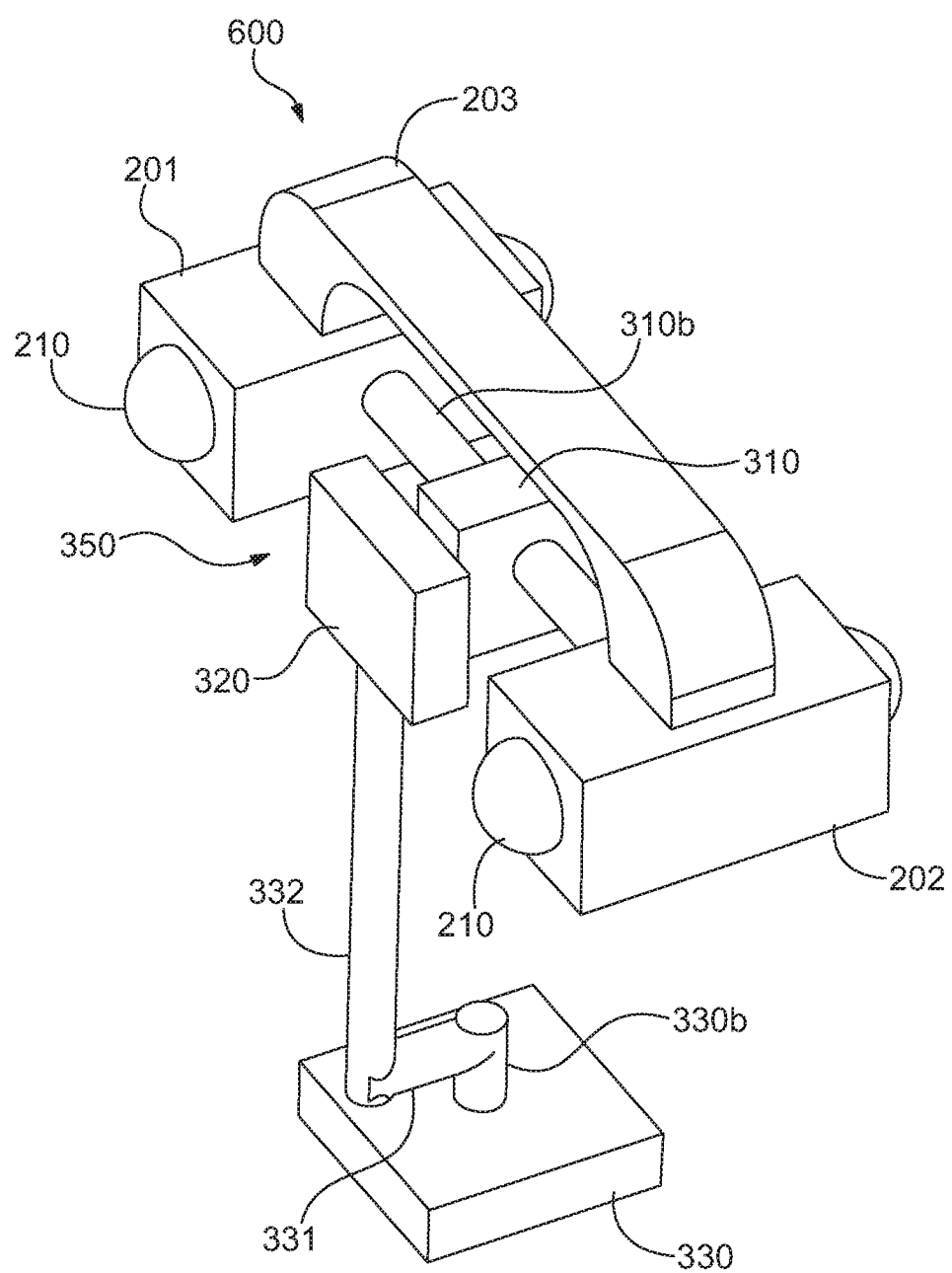
Figure 10D:
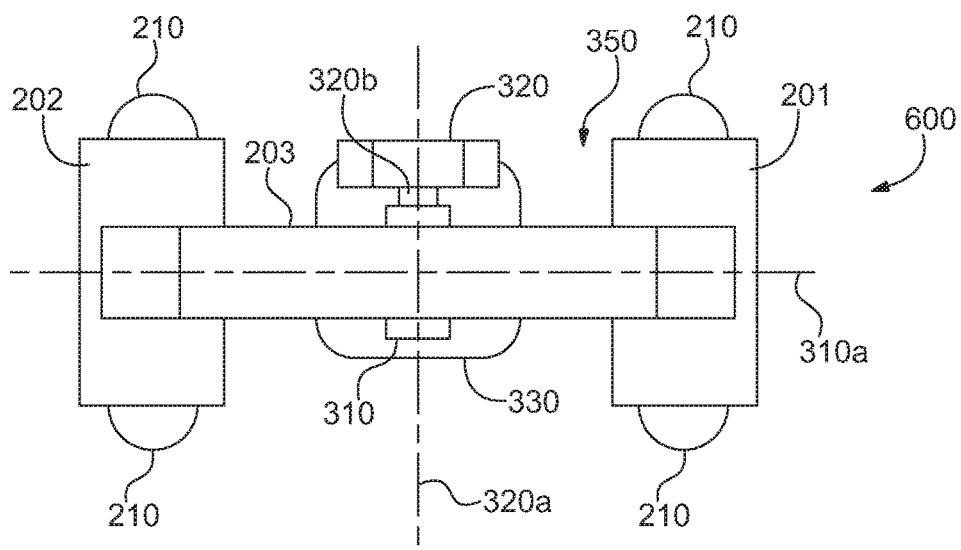
Figure 10E:
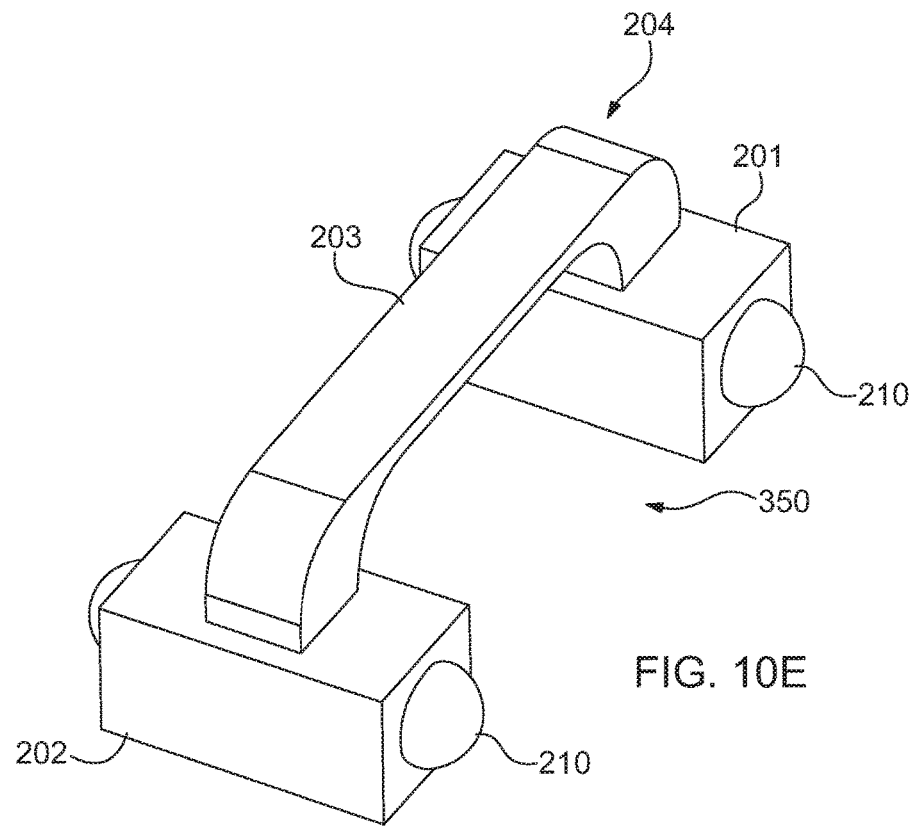

Still a further exemplary configuration of a camera system 500 in accordance with the present invention is illustrated in FIGS. 6-9, again with parts bearing the same reference numerals as those disclosed in FIGS. 1-3 having the same description as provided above in connection with FIGS. 1-3. One difference in the camera system 500 is that the locations of the pitch and roll motors 310, 320 may be exchanged so the roll motor 320 is disposed proximate the center of mass. In this regard the pitch motor 310 may include an axle 510b rotatably mounted thereto at a first end of the axle 510b and fixedly mounted at a second opposing end of the axle 510b to a sidewall 222 of the hole 250 of the camera body 220, FIG. 7. Thus, rotation of the pitch motor 310 relative to the pitch axle 510b will cause rotation of the camera 200 about the pitch axis 310a. The pitch and roll motors 310, 320 may be fixedly mounted to each other via a linkage 531 which may be U-shaped, such as by connecting the casings of the pitch and roll motors 310, 320 to one another. The roll motor 320 may include a roll axle 510b rotatably mounted thereto at a first end of the roll axle 510b, and a second opposing end of the roll axle 510b may be fixedly connected to the linkage 332. Rotation of the roll motor 320 relative to the roll axis 320b will cause rotation of the camera 200 about the roll axis 320b.

Still further, yet another exemplary configuration of a camera system 600 in accordance with the present invention may include two separate camera modules 201, 202 each having two cameras disposed therein, each camera having its own lens 210, FIGS. 10A-10E, where parts bearing the same reference numerals as those disclosed in FIGS. 1-3 have the same description as provided above in connection with FIGS. 1-3. One difference from the camera system 100 of FIGS. 1-3 is the absence of the camera body 220. Instead, each camera module 201, 202 may be separately mounted on a respective end of the pitch axle 310b providing a gap 350 therebetween which contains the center of mass of the two camera modules 201, 202 collectively. Thus, as before, the pitch motor 310 may be disposed at the center of mass within the gap 350, this time between the two camera modules 201, 202. Similarly, the roll motor 320 may be disposed within the gap 350 proximate the center of mass. Since the camera modules 201, 202 are disposed on the same axle 310b, rotation of the pitch motor 310 rotates both camera modules 201, 202 in unison. By providing camera modules 201, 202 without the camera body 220, a more compact and lightweight design is possible which may also permit the use of smaller or less powerful motors 310, 320, 300. At the same time, the stabilizer 300 can have additional freedom of movement to stabilize more extreme angles of rotation. Still further, the more compact design also allows opposing pairs of lenses 210 on each camera module 201, 202 to be placed closer together making the camera modules 201, 202 thinner. Thinner camera modules 201, 202 may also mean that less pivotal force is needed to rotate the modules 201, 202.

In addition, it is possible that the camera modules 201, 202 may be removably attached to the pitch axle 310b. In this regard, it may be desirable to provide a mounting bracket 203 that attaches the two camera modules 201, 202 to one another, FIGS. 10C-10D, so that the camera modules 201, 202 may be maintained in fixed location relative to one another when the modules 201, 202 are removed from the axle 310b, FIG. 10E.

Suitable exemplary camera configurations and methodologies for creating a 3D panoramic virtual reality environment for use in the stabilized camera systems 100, 400, 500 of the present invention may also be found in U.S. Pat. No. 9,007,430, the contents of which are incorporated herein by reference.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A stabilized camera system, comprising: a camera having a center of mass associated therewith and having a gap disposed therein, the gap containing the center of mass of the camera; and a stabilizer operably connected to the camera for stabilizing motion of the camera, the stabilizer comprising a plurality of motors operably connected to one another each motor having an axis of rotation associated therewith, a selected one of the motors being disposed in the gap proximate the location of the center of mass of the camera, wherein the camera comprises an axle mounted on the camera, the axle disposed in and extending through the gap; and wherein the center of the selected one of the motors is disposed at the center of mass of the camera.

2. The stabilized camera system according to claim 1, wherein each motor is operable to rotate the camera about its associated axis of rotation to stabilize motion of the camera.

3. The stabilized camera system according to claim 1, wherein the center of the gap is located at the center of mass of the camera.

4. The stabilized camera system according to claim 1, wherein the center of the selected one of the motors is disposed at the center of the gap.

5. The stabilized camera system according to claim 1, wherein a selected two of the motors are disposed in the gap.

6. The stabilized camera system according to claim 1, wherein the selected one of the motors is rotatably mounted to the axle and is operable to rotate the axle in response to rotation by the selected one of the motors.

7. The stabilized camera system according to claim 1, wherein the plurality of motors comprises three motors mounted on three axes orthogonal to each other, the three motors each configured to rotate about a respective one of the three orthogonal axes to rotate the camera about each of the three axes.

8. The stabilized camera system according to claim 1, wherein the camera comprises a plurality of imaging systems disposed about the gap, each imaging system configured to create an image thereat.

9. The stabilized camera system according to claim 8, wherein each imaging system comprises a fisheye lens.

10. The stabilized camera system according to claim 1, wherein the camera comprises a body having a hole disposed therein in which the gap is disposed.

11. The stabilized camera system according to claim 1, wherein the camera comprises a plurality of camera modules with the gap disposed therebetween.

12. A stabilized camera system, comprising: a camera having a center of mass associated therewith and having a gap disposed therein, the gap containing the center of mass of the camera; and a stabilizer operably connected to the camera for stabilizing motion of the camera, the stabilizer comprising a plurality of motors operably connected to one another each motor having an axis of rotation associated therewith, a selected one of the motors being disposed in the gap proximate the location of the center of mass of the camera, wherein the camera comprises a plurality of camera modules with the gap disposed therebetween, and wherein a selected one of the motors includes an axle extending therethrough, the motor operable to rotate the axle, and wherein a first of the plurality of camera modules is disposed on a first end of the axle and a second of the plurality of camera modules is disposed on a second opposing end of the axle; and wherein the center of the selected one of the motors is disposed at the center of mass of the camera.

13. The stabilized camera system according to claim 12, wherein each motor is operable to rotate the camera about its associated axis of rotation to stabilize motion of the camera.

14. The stabilized camera system according to claim 12, wherein the center of the gap is located at the center of mass of the camera.

15. The stabilized camera system according to claim 12, wherein the center of the selected one of the motors is disposed at the center of the gap.

16. The stabilized camera system according to claim 12, wherein a selected two of the motors are disposed in the gap.

17. The stabilized camera system according to claim 12, wherein the plurality of motors comprises three motors mounted on three axes orthogonal to each other, the three motors each configured to rotate about a respective one of the three orthogonal axes to rotate the camera about each of the three axes.

18. The stabilized camera system according to claim 12, wherein the camera comprises a plurality of imaging systems disposed about the gap, each imaging system configured to create an image thereat.

19. The stabilized camera system according to claim 18, wherein each imaging system comprises a fisheye lens.

20. The stabilized camera system according to claim 12, wherein the camera comprises a plurality of camera modules with the gap disposed therebetween.

* * * * *